(12) United States Patent
Stählin et al.

(10) Patent No.: US 8,451,786 B2
(45) Date of Patent: May 28, 2013

(54) DEVICE AND METHOD FOR TRANSMITTING INFORMATION

(75) Inventors: Ulrich Stählin, Eschborn (DE); Marc Menzel, Marburg (DE); Stefan Lüke, Olpe (DE)

(73) Assignee: Continental Teves AG & Co. oHG (DE)

( * ) Notice: Subject to any disclaimer, the term of this patent is extended or adjusted under 35 U.S.C. 154(b) by 347 days.

(21) Appl. No.: 12/674,939

(22) PCT Filed: Aug. 15, 2008

(86) PCT No.: PCT/EP2008/060772
§ 371 (c)(1), (2), (4) Date: Feb. 24, 2010

(87) PCT Pub. No.: WO2009/027251
PCT Pub. Date: Mar. 5, 2009

(65) Prior Publication Data
US 2011/0164594 A1    Jul. 7, 2011

(30) Foreign Application Priority Data

Aug. 29, 2007  (DE) .......................... 10 2007 040 974
Aug. 29, 2007  (DE) .......................... 10 2007 040 991

(51) Int. Cl.
*H04W 4/00*       (2009.01)
(52) U.S. Cl.
USPC .................. 370/329; 370/338; 455/552.1
(58) Field of Classification Search
None
See application file for complete search history.

(56) References Cited

U.S. PATENT DOCUMENTS

| 2003/0139179 | A1  | 7/2003 | Fuchs et al. |
| 2006/0141760 | A1  | 6/2006 | Brandl et al. |
| 2007/0069030 | A1  | 3/2007 | Sauerwein et al. |
| 2007/0178935 | A1* | 8/2007 | Shim et al. ................ 455/552.1 |
| 2008/0046175 | A1* | 2/2008 | Tengler et al. ............... 701/210 |
| 2009/0016245 | A1* | 1/2009 | Karls ............................ 370/310 |

FOREIGN PATENT DOCUMENTS

| DE | 10 2008 009 330 | 2/2008 |
| EP |       1523130 A2 | 4/2005 |
| EP |       2 133 849 | 12/2009 |
| JP |       2004080420 A | 3/2004 |
| WO | WO2004/008522 A2 | 1/2004 |
| WO | WO 2009/071348 | 6/2009 |

OTHER PUBLICATIONS

German Search Report for DE 10 2008 037 880.1 dated Feb. 26, 2010.
Tony K. Mak, Kenneth P. Laberteaux, Raja Sengupta: "A Multi-Channel VANET Providing Concurrent Safety and Commercial Services", Sep. 2005, Seiten 1-9, XP002511742.

* cited by examiner

*Primary Examiner* — Jianye Wu
(74) *Attorney, Agent, or Firm* — RatnerPrestia

(57) ABSTRACT

An apparatus and a method for transmitting information in vehicle-to-vehicle communication based on IEEE802.11 standard WLAN, which involves both safety information based on the IEEE802.11p standard and non-safety-related information based on another IEEE802.11 standard being transmitted. The apparatus is equipped with a transmission and/or reception device which has a WLAN chipset. In order to achieve the vehicle-to-vehicle communication with a single piece of hardware, provision is made for the WLAN chipset to be able to be changed over by a control command between a first mode based on the IEEE802.11p standard and a second mode based on another IEEE802.11 standard and for the apparatus to have a control device which changes over the mode of the WLAN chipset using a control command.

6 Claims, 2 Drawing Sheets

DEVICE AND METHOD FOR TRANSMITTING INFORMATION

CROSS-REFERENCE TO RELATED APPLICATIONS

This application is the U.S. national phase application of PCT International Application No. PCT/EP2008/060772, filed Aug. 15, 2008, which claims priority to German Patent Application No. 10 2007 040 991.7, filed Aug. 29, 2007, and German Patent Application No. 10 2007 040 974.7, filed Aug. 29, 2007, the content of such applications being incorporated by reference herein.

FIELD OF THE INVENTION

The invention relates to an apparatus and a method for transmitting, i.e. for receiving and/or sending, particularly also safety information in vehicle-to-vehicle communication based on IEEE802.11 standard WLAN (Wireless Local Area Network), which is incorporated by reference.

BACKGROUND OF THE INVENTION

Vehicle-to-vehicle communication is increasingly being used for transmitting safety information from one vehicle to another vehicle, for example in order to warn the driver of hazard situations or to provide support for driver assistance systems in the vehicle.

Experiments have shown that the wireless network engineering based on the IEEE802.11 standard is suitable, in principle, for setting up such ad-hoc communication networks in which the vehicles in the respective reception range are involved.

For the purpose of implementing suitable vehicle-to-vehicle communication, the IEEE802.11p standard has been agreed for future applications, said standard forming the basis for what are known as DSRC (Dedicated Short Range Communication) systems, which relates to the physical layer and the data link layer
that is to say the bottom two layers of what is known as the OSI reference model for technical implementation of data transmission. In line with this standard, a plurality of wireless channels are used, from which one channel is used as a control channel. This control channel is used to periodically send vehicle status information. This means that all the network nodes which are present in the vehicles must continuously or periodically monitor said control channel. Transmission requests for other channels are initially communicated to the respective destination node on the control channel.

Since the transmission methods of wireless networks (WLAN) are usually unsynchronized, i.e. the transmission and reception devices involved in the system do not have a common time base, separate frequency ranges are provided for normal information (subsequently also called infotainment) and safety information for safety applications, for example WLAN based on the IEEE802.11a/b/g/n standards for infotainment and WLAN based on the IEEE802.11p standard for safety applications. Another option for WLAN based on the IEEE802.11p standard is that a plurality of adjacent channels are used for the various tasks (pilot channel, service channel).

However, the use of different frequencies requires the use of different hardware. Usually, one receiver per channel is required. This means that a vehicle needs two hardware components in order to be able to cover both areas of activity (safety applications and infotainment).

SUMMARY OF THE INVENTION

It is an object of the present invention to propose a way of using a single piece of hardware for the transmission of safety information and infotainment.

The apparatus proposed according to aspects of the invention for receiving information in vehicle-to-vehicle communication based on IEEE802.11 standard WLAN, which involves both safety information based on the IEEE802.11p standard and non-safety-related information based on another IEEE802.11 standard, particularly based on the IEEE802.11a, b, g and/or n standard, being transmitted, has a transmission and/or reception device having a WLAN chipset in order to be able to transmit, i.e. send and/or receive, the information.

In line with the invention, the WLAN chipset provided in the reception device can be changed over by means of a control command between a first transmission and/or reception mode based on the IEEE802.11p standard and a second transmission and/or reception mode based on the other IEEE802.11 standard. To this end, the apparatus has a control device which changes over the mode of the WLAN chipset using a control command.

Such chipsets, which can be set to different transmission modes, are already known in principle. By way of example, the Atheros company already supplies such chips. Typically, these settable chips can be employed in different frequency ranges, for example 2.4 GHz and 5.8 GHz, and in the modes suitable for this, for example IEEE802.11a for 5.8 GHz in comparison with IEEE802.11b/g for 2.4 GHz. Software modifications also allow these chipsets to be employed for the IEEE802.11p standard at 5.9 GHz. In the near future, further WLAN chipsets can be expected which are also nominally designed for the IEEE802.11p standard at 5.8 GHz and can be changed over to other frequency ranges.

Preferably, the control device is set up to give the control command for changing over the mode on the basis of a particular vehicle state. By way of example, when a vehicle is moving, the first mode, allowing the transmission of safety information, is selected. When the vehicle is stationary, it is then possible to change over to the second mode of the WLAN chipset in order to be able to transmit non-safety-related information, particularly what is known as infotainment information. When the vehicle is stationary, i.e. when it is not involved in the road traffic, it is also possible for said non-safety-related information to be transmitted without distracting the driver. During the journey, on the other hand, such information should not be transmitted so as not to adversely affect the driver's attention. In line with the invention, it therefore makes particular sense to provide a single piece of hardware which can be changed over between different transmission and reception modes in order to be able to transmit safety-related information and infotainment information at different times. The changeover between the different transmission modes can then be effected automatically on the basis of the state of the vehicle (travel mode, rest time or the like).

Particularly in order to be able to easily ascertain the vehicle state, the control device may preferably have an interface to a vehicle control system. Suitable vehicle control systems are, in particular, assistance systems such as ESP, driver assistance systems or the APIA (Active Passive Integration Approach), which is used to prevent accidents or to lessen the consequences of accidents through communication of all passive and active safety systems and assessment of accident probability. This system is described in detail in WO 2004/08522 A1, which is incorporated by reference.

In line with the invention, the present invention also extends to the use of a WLAN chipset for transmitting information in vehicle-to-vehicle communication based on IEEE802.11 standard WLAN, which chipset can be changed over by means of a control command between a first transmission and/or reception mode based on the IEEE802.11p standard and at least one further transmission and/or reception mode based on another IEEE802.11 standard. The communication involves both safety information based on the IEEE802.11p standard and non-safety-related information (infotainment) based on another IEEE802.11 standard, particularly the IEEE802.11a, b, g and/or n standard, being transmitted. This use avoids the provision of two different WLAN chipsets for vehicle-to-vehicle communication taking place on different frequencies.

Similarly, the present invention also relates to a method for transmitting information in vehicle-to-vehicle communication based on IEEE802.11 standard WLAN, which involves both safety information based on the IEEE802.11p standard and non-safety-related information based on another IEEE802.11 standard, particularly the aforementioned standards, being transmitted. So that said transmission can be effected using a single piece of transmission and reception hardware, the invention proposes changing over a WLAN chipset between a first transmission and/or reception mode based on the IEEE802.11p standard and a second transmission and/or reception mode based on another IEEE802.11 standard.

In line with the invention, it is particularly advantageous if the mode of the WLAN chipset is changed over on the basis of the vehicle state. In this case, the WLAN chipset can be changed over automatically on the basis of prescribed rules.

In particular, provision may be made, to this end, for the changeover to the first mode based on the IEEE802.11p standard to be effected when a vehicle is traveling. In this regard, the control device giving the control command for changeover can use an interface to a vehicle control system, for example, to establish whether the vehicle is moving, whether the vehicle engine is running or the like. During this vehicle use in the regular travel mode, no infotainment applications can then be sent. Only in a vehicle state which makes it possible to infer that the vehicle is not involved in road traffic is the other IEEE802.11 standard selected and the reception of infotainment applications permitted.

In line with another embodiment, the changeover between the first mode based on the IEEE802.11p standard and the second mode based on another IEEE802.11 standard can also be effected after prescribed intervals of time. This defines particular time slots (slots) in which the IEEE802.11p transmission of safety information is possible. During the remaining times, it is then possible for infotainment applications to be transmitted, including regardless of whether or not the vehicle is moving. This combination of the transmission can also be combined with the previously described changeover on the basis of the vehicle state, for example in order to obtain safety information regularly even when a vehicle is stationary and not involved in the travel mode.

Further advantages, features and application options for the present invention can also be found in the description below of exemplary embodiments and in the drawing. In this context, all the features described and/or shown in the figures form the subject matter of the present invention on their own or in any combination, including independently of their synopsis in the claims or the back-references therein.

BRIEF DESCRIPTION OF THE DRAWINGS

The invention is best understood from the following detailed description when read in connection with the accompanying drawings. Included in the drawings is the following features.

DETAILED DESCRIPTION OF THE EMBODIMENTS

Figure 1:
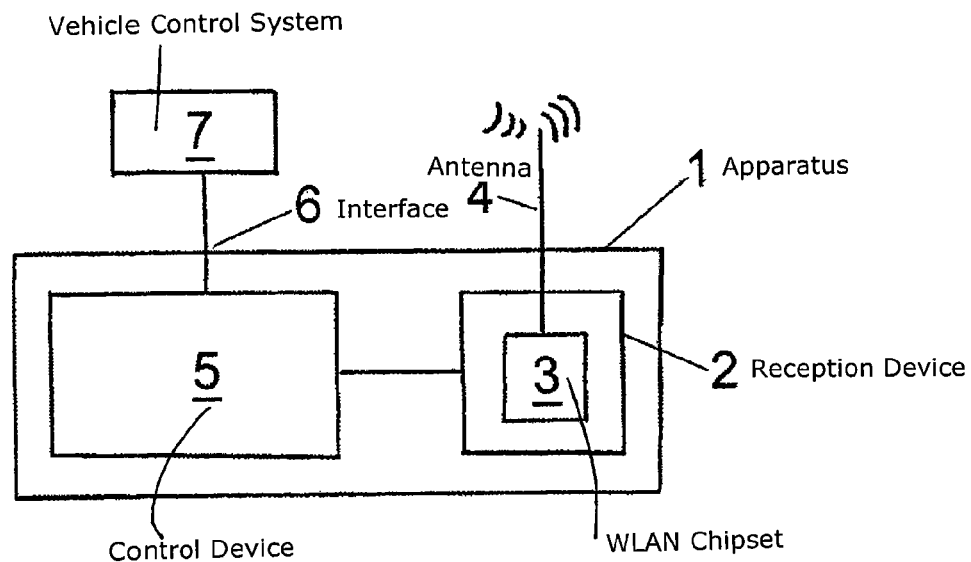
FIG. 1 schematically shows an inventive apparatus for receiving or sending information based on different WLAN IEEE802.11 standards.

The apparatus 1 shown in FIG. 1 for transmitting information in the vehicle-to-vehicle communication using WLAN communication based on the IEEE802.11 standard has a transmission and/or reception device 2 which includes a WLAN chipset 3 which allows the transmission and/or reception of radio communication messages. To this end, the WLAN chipset 3 is connected to a suitable antenna 4.

The WLAN chipset 3 and the antenna 4 are set up for the carrier frequency, which can be used to transmit the radio messages in the vehicle-to-vehicle communication.

In order to be able to transmit, i.e. receive and/or send, both safety information based on the IEEE802.11p standard and non-safety-related information (what is known as infotainment information) based on another IEEE802.11 standard, the WLAN chipset 3 can be changed over between a first transmission and reception mode based on the IEEE802.11p standard and a second transmission and reception mode based on another IEEE802.11 standard. The other mode provides particularly for transmission based on the IEEE802.11a, b, g and/or n standard.

The WLAN chipset 3 is changed over by a control command which is produced by a control device 5 and which can be produced on the basis of prescribed rules or possibly even when prompted by the driver of the vehicle.

In order to be able to give the control command on the basis of the vehicle state, the control device 5 is equipped with an interface 6 to a vehicle control system 7 which is in the form of a driver assistance system and which has information about whether the vehicle is moving or is involved in the road traffic or is currently parked, for example. On the basis of said information, the control device 5 then changes over the WLAN chipset 3 between a first mode based on the IEEE802.11p standard and a second mode based on another IEEE802.11 standard, the first mode being selected when the vehicle is moving or is actively involved in the road traffic and the second mode being selected when the vehicle is parked or is not actively involved in the road traffic. In the first mode, safety information is transmitted, and in the second mode, non-safety-related infotainment information is transmitted.

Figure 2:
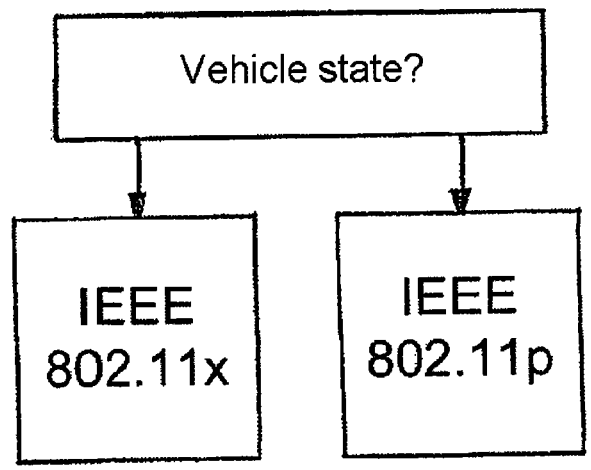
FIG. 2 schematically shows the flow of the method for changing over between different transmission and reception modes.

FIG. 2 schematically shows the flow of the proposed method in a simple flowchart.

In a first step, the control device 5 ascertains the vehicle state. If a vehicle is moving and is involved in the road traffic, it produces a control command which changes over the WLAN chipset to the first mode based on the IEEE802.11p standard or keeps it in this mode if said mode is already engaged.

If a vehicle is stationary and is not involved in the road traffic then, by contrast, a control command is produced which switches the WLAN chipset 3 to another IEEE802.11 standard, particularly the a, b, g or n standard. In line with the invention, the vehicle state is checked at prescribable intervals of time, so that a change in the vehicle state can quickly be established and the WLAN chipset 3 can be switched as appropriate.

Figure 3:
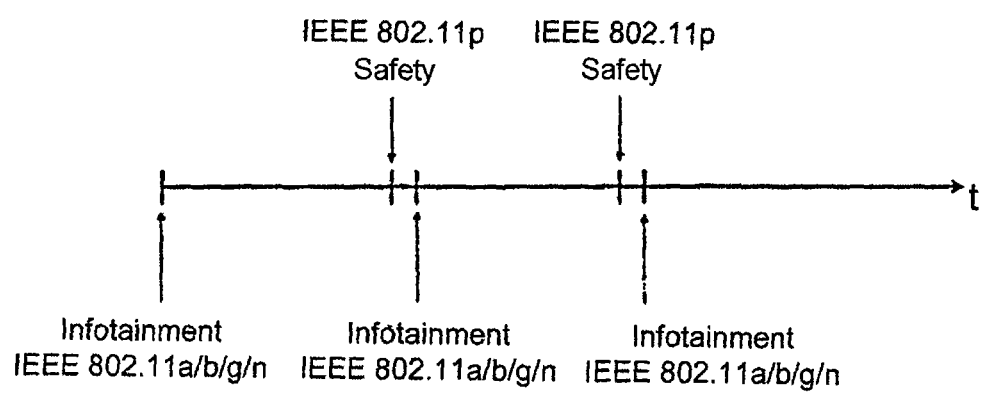
FIG. 3 shows time-based changeover of the different transmission and reception modes.

FIG. 3 schematically shows an alternative for the changeover between the different WLAN modes of the WLAN chipset 3. In this embodiment, the mode of the WLAN chipset 3 is changed over after prescribed intervals of time, so that the WLAN chipset 3 is set up to receive safety information in the first mode based on the IEEE802.11p standard and is set up to receive infotainment information in the second mode based on the IEEE802.11a, b, g or n standard.

The invention therefore allows a single chipset to be used to implement WLAN radio transmissions on different frequencies, which means that only one piece of hardware is required for the vehicle-to-vehicle communication, even when both safety information and infotainment information need to be transmitted.

The invention claimed is:

1. An apparatus for transmitting information in vehicle-to-vehicle communication based on IEEE802.11 standard WLAN, which involves both safety information based on the IEEE802.11p standard and non-safety-related information based on another IEEE802.11 standard being transmitted, said apparatus comprising:

a transmission and/or reception device which has a WLAN chipset, wherein the WLAN chipset switches between a first mode based on the IEEE802.11p standard and a second mode based on another IEEE802.11 standard in response to a control command generated based on a vehicle state indicating when the vehicle is moving and indicating when the vehicle is stationary.

2. The apparatus as claimed in claim 1, wherein the control device has an interface to a vehicle control system.

3. A method for controlling a WLAN chipset in a vehicle, the method comprising:

switching between a first mode based on a IEEE802.11p standard and a second mode based on another IEEE802.11 standard in response to a control command generated based on a vehicle state indicating when the vehicle is moving and indicating when the vehicle is stationary, and transmitting information in vehicle-to-vehicle communication based on IEEE802.11 standard WLAN, in which both safety information based on the IEEE802.11p standard and non-safety-related information based on another IEEE802.11 standard are transmitted.

4. A method for transmitting information in vehicle-to-vehicle communication based on a IEEE802.11 standard WLAN, which involves both safety information based on a IEEE802.11p standard and non-safety-related information based on another IEEE802.11 standard being transmitted, the method comprising:

switching between a first mode based on the IEEE802.11p standard and a second mode based on another IEEE802.11 standard in response to a control command generated based on a vehicle state indicating when the vehicle is moving and indicating when the vehicle is stationary.

5. The method as claimed in claim 4, wherein the changeover to the first mode based on the IEEE802.11p standard is effected when a vehicle is travelling.

6. The method as claimed in claim 4, wherein the changeover between the first mode based on the IEEE802.11p standard and the second mode based on another IEEE802.11 standard is effected after prescribed intervals of time.

* * * * *